United States Patent
Wang He

(10) Patent No.: US 9,097,827 B2
(45) Date of Patent: Aug. 4, 2015

(54) LIGHT GUIDING PLATE

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 149 days.

(21) Appl. No.: 14/010,583

(22) Filed: Aug. 27, 2013

(65) Prior Publication Data

US 2014/0177277 A1    Jun. 26, 2014

(30) Foreign Application Priority Data

Dec. 26, 2012    (TW) .............................. 101150277 A

(51) Int. Cl.
| | |
|---|---|
| *F21V 8/00* | (2006.01) |
| *G02F 1/1335* | (2006.01) |
| *B82Y 20/00* | (2011.01) |
| *G02B 6/122* | (2006.01) |

(52) U.S. Cl.
CPC .............. *G02B 6/0036* (2013.01); *B82Y 20/00* (2013.01); *G02B 6/1225* (2013.01); *G02F 1/133604* (2013.01); *G02F 1/133606* (2013.01)

(58) Field of Classification Search
CPC .. G02B 6/0036; G02B 6/0053; G02B 6/0031; G02B 6/0016; G02B 6/0038; G02B 6/1225; G02B 6/122; B82Y 20/00; G02F 1/133606; G02F 1/133608

See application file for complete search history.

(56) References Cited

U.S. PATENT DOCUMENTS

| | | | | |
|---|---|---|---|---|
| 6,011,602 | A * | 1/2000 | Miyashita et al. | 349/65 |
| 6,367,941 | B2 * | 4/2002 | Lea et al. | 362/619 |
| 7,585,098 | B2 * | 9/2009 | Mikami | 362/608 |
| 7,628,502 | B2 * | 12/2009 | Kodama et al. | 362/97.1 |
| 8,899,815 | B2 * | 12/2014 | Chen et al. | 362/619 |
| 2011/0292680 | A1 * | 12/2011 | Tsai | 362/607 |

* cited by examiner

*Primary Examiner* — Akm Enayet Ullah
(74) *Attorney, Agent, or Firm* — Novak Druce Connolly Bove + Quigg LLP

(57) ABSTRACT

A light guide plate includes a light incident surface, a light output surface, a bottom surface opposite to the light output surface, and a plurality of dots formed on the bottom surface. Each dot includes a first curved surface, a second curved surface and two flat surfaces separately interconnecting the first curved surface and the second curved surface. The first curved surface is configured for perpendicularly reflecting light towards the light output surface. The second curved surface is configured for scattering and reflecting light back into the light guide plate. The two flat surfaces are configured for diverging light to lateral sides of an original path.

8 Claims, 4 Drawing Sheets

LIGHT GUIDING PLATE

BACKGROUND

1. Technical Field

The present disclosure relates to a light guiding plate used in backlight system, and particularly to a light guiding plate with disturbed dots.

2. Description of Related Art

The liquid crystal of the liquid crystal display panel does not glow, therefore, in order to display, the liquid crystal display panel must be supplied with planar light source device, for example, a backlight system, to supply planar light source with sufficient luminance and uniform distributed to the liquid crystal display panel. The present backlight system is mainly composed of light source and light guiding plate. The light source can be set on one side or two sides of the light guiding plate and emits light into the light guiding plate. The light guiding plate is to guide the direction of the light to make the light uniformly emit from the light-emitting surface of the light guiding plate. To increase the light-emitting efficiency and uniformity of the light guiding plate, notches or dots are usually set on one surface of the light guiding plate, the distance and the sizes of the notches or the dots distributed on the light guiding plate can vary with design. When light transmit to the light guiding plate, light will be reflected or scattered, and be transmitted to different directions, then emitted outside from the light-emitting surface of the light guiding plate. By the density of the distribution and sizes difference of the notches or the dots, the light guiding plate can emit uniformly.

As the light guiding plat scatters lights as dispersed as possible, the lights transmitted by the light guiding plate can be scattered to various different directions, therefore the defect of insufficient luminance caused by the scattering of lights is definitely occurred.

Generally, to overcome the defect of insufficient luminance, a prism plate is set on the light output surface of the light guiding plate, the prism plate can guide the light to collect on right front of the light guiding plate to increase the luminance of the light guiding light. However, the setting of the prism plate increases the number of elements in the backlight system which complicates the structure further, it does not benefit to lighten and slim the backlight system. Moreover, the collection of the light by the prism plate breaks the uniformity of the light guiding plate, the quality of the backlight system is affected.

DETAILED DESCRIPTION

Embodiments will now be described in detail below with reference to the appended figures.

Figure 1:
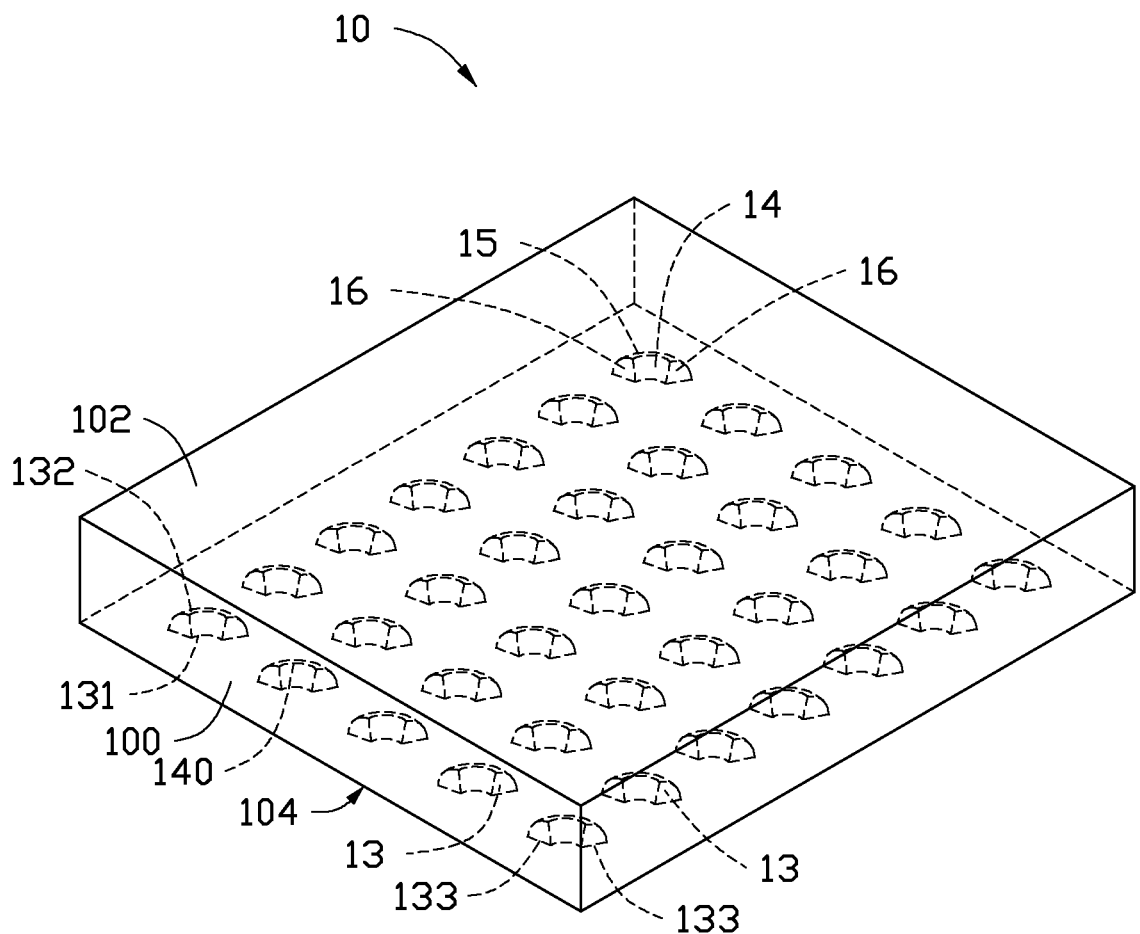
FIG. 1 is a schematic view of a light guiding plate according to an embodiment of the present disclosure.
Figure 2:
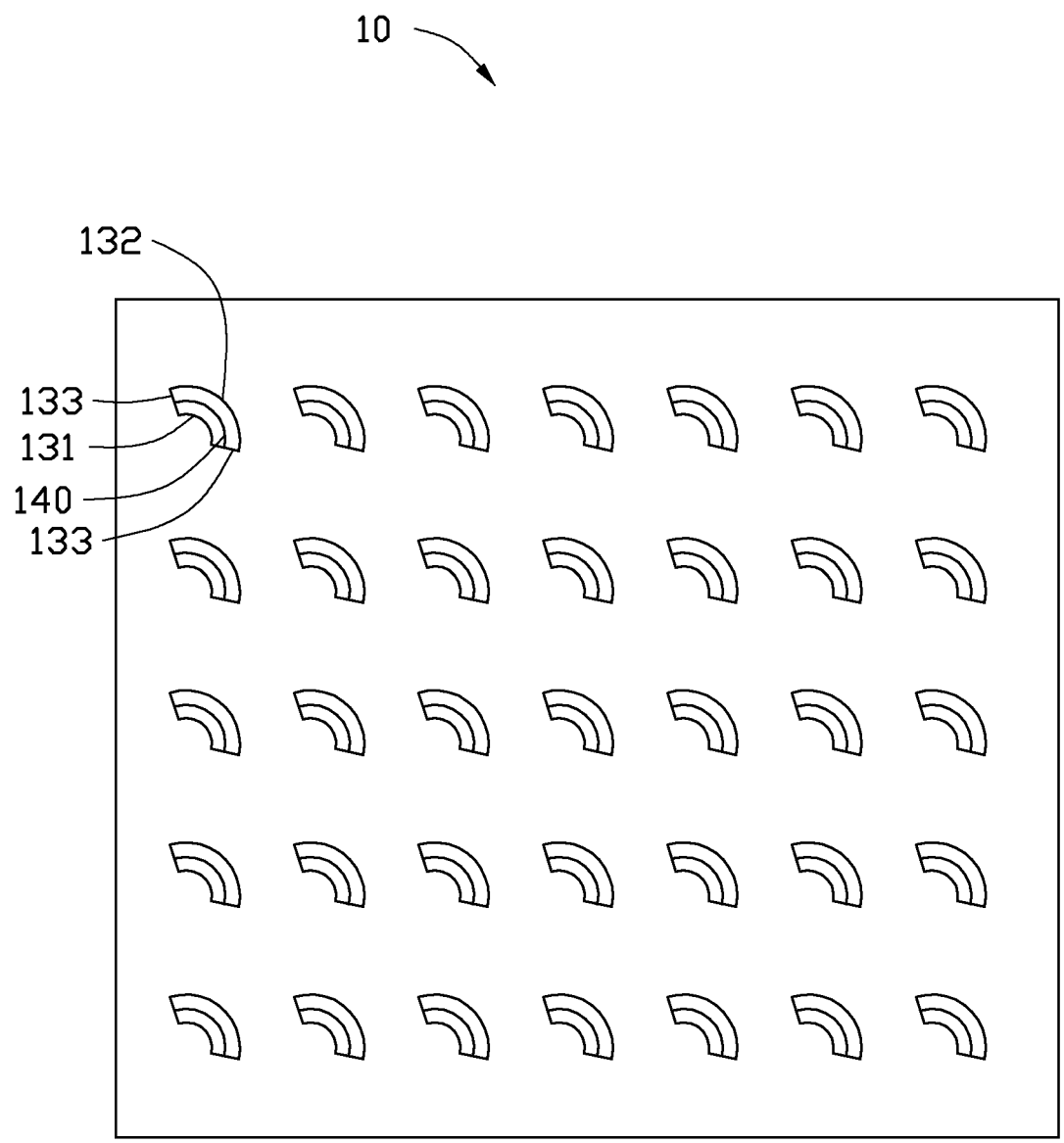
FIG. 2 is a top-view of the light guiding plate of FIG 1.

FIGS. 1-2 show a light guiding plate 10 according to an embodiment. The light guiding plate 10 comprises a plurality of dots.

The light guiding plate 10 which is made of light transmissive material, comprises: a light incident surface 100, a light output surface 102 and a bottom surface 104 opposite to the light output surface 102.

The dots are set on the bottom surface 104 in order to reflect the entering light. In this embodiment, the dots are recessions 13 formed on the bottom surface 104.

Each recession 13 has a flabellate shaped opening on the bottom surface 104, and the opening includes an inner arc 131 with a smaller radius, an outer arc 132 with radius greater then the radius of the inner arc 131, and two connection lines 133 connecting the inner are 131 and the outer arc 132.

Each recession 13 includes a first curved surface 14, a second curved surface 15 and two flat surfaces 16.

The first curved surface 14 is a lateral surface extending from the inner arc 131 toward the inner of the light guiding plate 10, and the first curved surface forms a bottom edge 140 on the bottom of the recession 13.

The second curved surface 15 extends from the outer arc 132 to the bottom edge 140. Thereby, the second curved surface 15 and the first curved surface 14 meet at the bottom edge 140. In other words, the second curved surface 15 sinks from the bottom surface 104 of the light guiding plate 10 toward the inner of the light guiding plate 10.

The two flat surfaces 16 separately extend from the two connection lines 133 of the flabellate shaped opening to the bottom edge 140.

Figure 3:
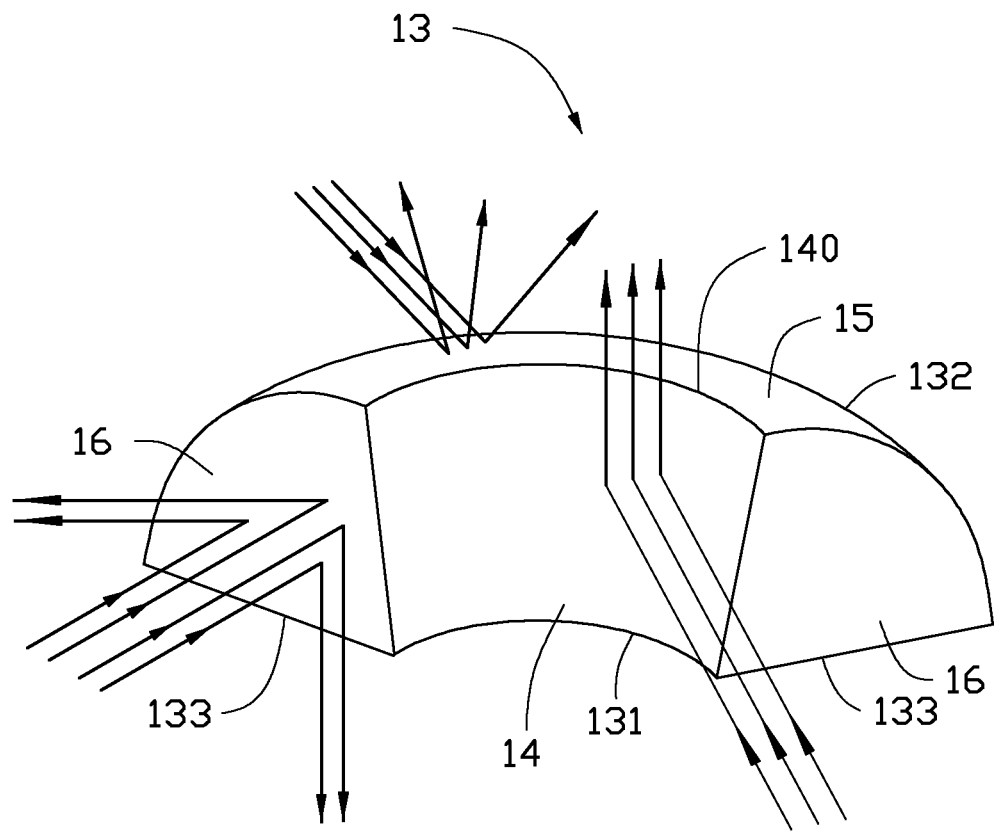
FIG. 3 is a schematic view of a dot of the light guiding plate.

FIGS. 1 and 3 show that lights from light source enter the light incident surface 100 of the light guiding plate 10 and are directed to one of the first curved surface 14, the second curved surface 15 and the two flat surfaces 16 of each recession 13. Lights directed to the first curved surface 14 are reflected by the first curved surface 14 to perpendicularly enter the light output surface 102 of the light guiding plate 10. Lights directed to the second curved surface 15 are reflected and are scattered by the second curved surface 15 to enter the light output surface 102 with various directions. In addition, lights directed to the two flat surfaces 16 are reflected and are scattered by the two flat surfaces 16 to the lateral sides of the original incident pathway and then transmitted forward, then reflected several times and emitted, to increase the diversity of the light-emitting directions emitting from the light output surface 102. Therefore, the uniformity of the light guiding plate 10 can be improved.

Lights directed to perpendicularly enter the light output surface 102 by the reflection of the first curved surface 14 are emitted from the right front direction of the light guiding plate 10, thus can effectively raise the luminance of the light guiding plate 10. Lights reflected and scattered in various directions by the reflection of the second curved surface 15 can ensure the uniformity of the light guiding plate 10. In addition, lights scattered to lateral sides of the original incident pathway by the reflection of the two flat surfaces 16 be reflected several times and then emit, this can effectively increase the diversity of the light-emitting directions, and further improve the uniformity of the light guiding plate 10. Therefore, the light guiding plate 10 cart possess both better luminance and uniformity.

In this embodiment, in order to raise the reflectivity of the first curved surface 14, the second curved surface 15 and the two flat surfaces 16, all of the first curved surface 14, the second curved surface 15 and the two flat surfaces 16 can be all coated with anti-reflective material.

Figure 4:
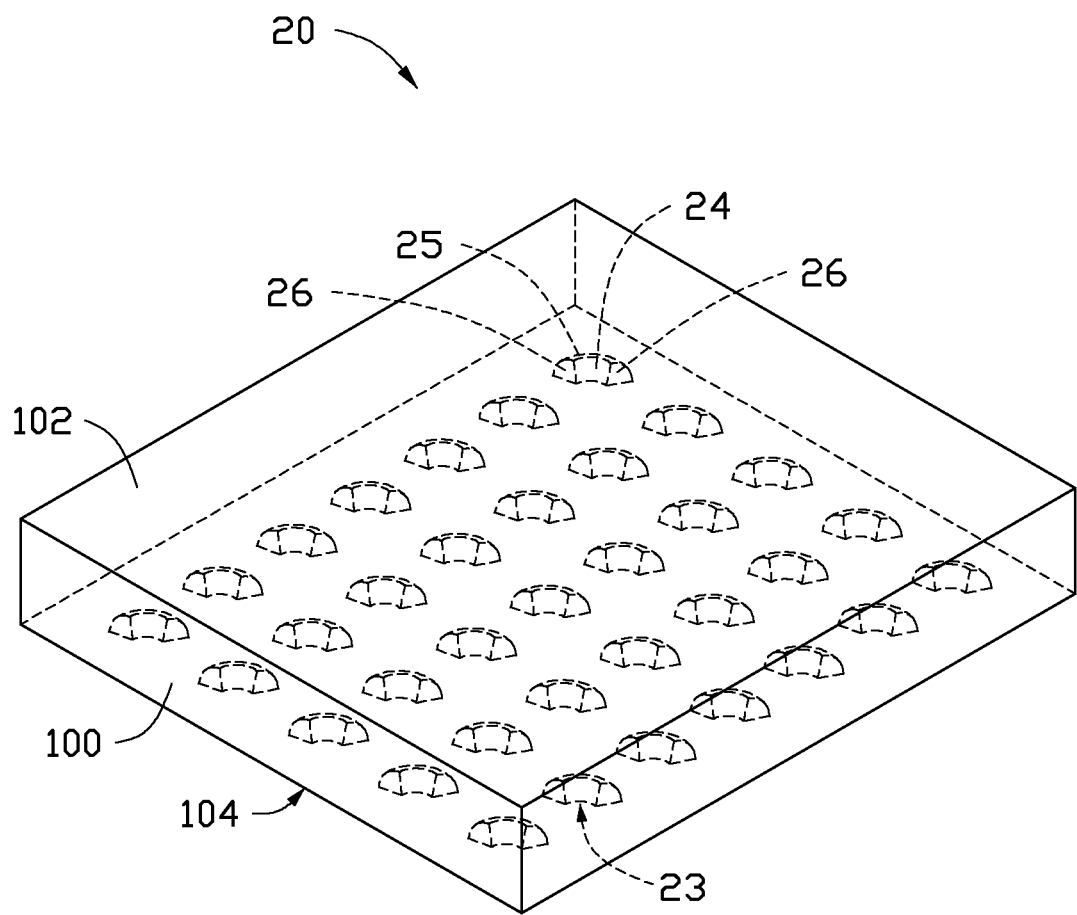
FIG. 4 is a schematic view of a light guiding plate according to other embodiment of present disclosure.

FIG. 4 shows a light guiding plate 20 according to other embodiment of present disclosure. In other embodiments, the recessions 13 of above embodiment can be replaced with reflective blocks 23 protruding from the bottom surface 104, thereby the first curved surface 24, the second curved surface 25 and the two flat surfaces 26 can be set as the four lateral surfaces of each of the reflective blocks 23. Meanwhile the bottom surface of each reflective block 23 is coplanar with the bottom surface 104 of the light guiding plate.

In the embodiments, the first curved surface 14, 24 guides the light to perpendicularly enter the light output surface 102 of the light guiding plate 10, 20 to raise the luminance of the light guiding plate 10, 20. The second curved surface 15, 25 scatters the light to various different directions to ensure the uniformity of the light guiding plate 10, 20. In addition, the flat surfaces 16, 26 scatter the light to lateral sides of the original incident pathway to effectively increase the diversity of the directions of the emitted lights, thereby further improving the uniformity of the light guiding plate 10, 20.

The above-mentioned embodiments of the present disclosure are intended to be illustrative only. Persons skilled in the art may devise numerous alternative embodiments without departing from the scope of the following claims.

What is claimed is:

1. A light guiding plate, comprising:
   a light incident surface;
   a light output surface;
   a bottom surface opposite to the light output surface; and
   a plurality of dots formed on the bottom surface, wherein each dot comprises a first curved surface, a second curved surface and two flat surfaces interconnecting the first curved surface and the second curved surface, lights which are directed to the first curved surface are reflected by the first curved surface to perpendicularly enter the output surface, lights which are directed to the second curved surface are scattered and reflected by the second curved surface to the inner of the light guiding plate, lights which are directed to the two flat surfaces are reflected and scattered by the two flat surfaces to lateral sides of the original incident pathway of the lights which enter the two flat surfaces.

2. The light guiding plate as claimed in claim 1, wherein the dots are recessions defined in the bottom surface of the light guiding plate.

3. The light guiding plate as claimed in claim 2, wherein each of the recessions has a flabellate shaped opening on the bottom surface, the opening comprises an inner arc, an outer arc with a radius greater than a radius of the inner arc, and two connection lines connecting the inner arc and the outer arc.

4. The light guiding plate as claimed in claim 3, wherein the first curved surface is a lateral surface extending from the inner arc toward the inner of the light guiding plate, the second curved surface sinks from the outer arc toward the inner of the light guiding plate and meets the first curved surface at a bottom edge of the first curved surface; and the two flat surfaces separately extend from the two connection lines to intersectional points of the first curved surface and the second curved surface.

5. The light guiding plate as claimed in claim 4, wherein the first curved surface, the second curved surface and the two flat surfaces are all coated with anti-reflective material.

6. The light guiding plate as claimed in claim 1, wherein the dots are reflective blocks protruding from the bottom surface of the light guiding plate.

7. The light guiding plate as claimed in claim 6, wherein a bottom surface of each of the reflective blocks and the bottom surface of the light guiding plate are coplanar, the bottom surface of each of the reflective blocks is flabellate shaped and comprises an inner arc, an outer arc with a radius greater then a radius of the inner are, and two connection lines connecting the inner arc and the outer arc.

8. The light guiding plate as claimed in claim 7, wherein the first curved surface extents from the inner arc toward the inner of the light guiding plate, the second curved surface protrudes from the outer arc toward the inner of the light guiding plate and meets the first curved surface at a top edge of the first curved surface; and the two flat surfaces separately extend from the two connection lines to intersectional points of the first curved surface and the second curved surface.

* * * * *